Patented Oct. 15, 1935

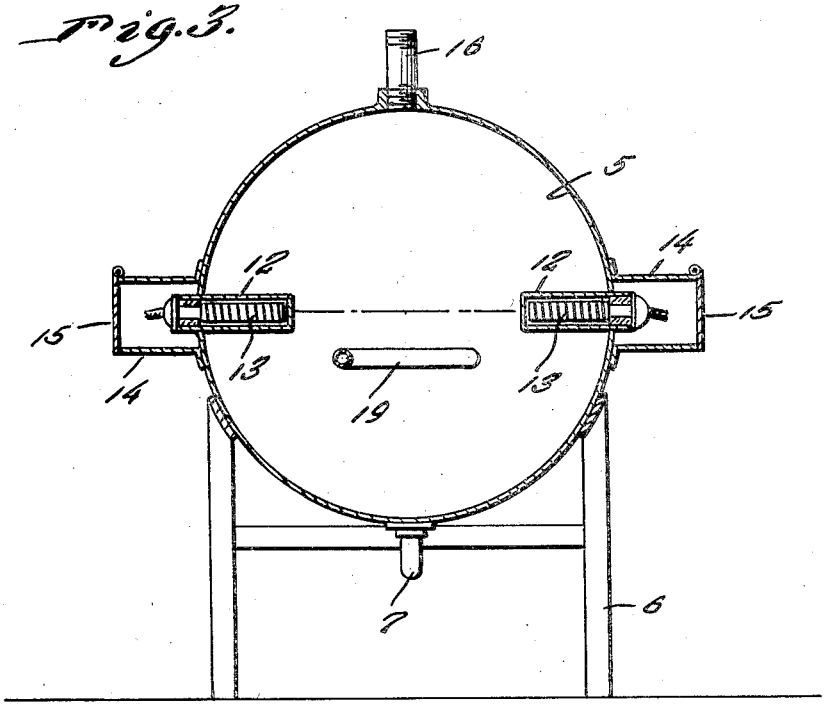
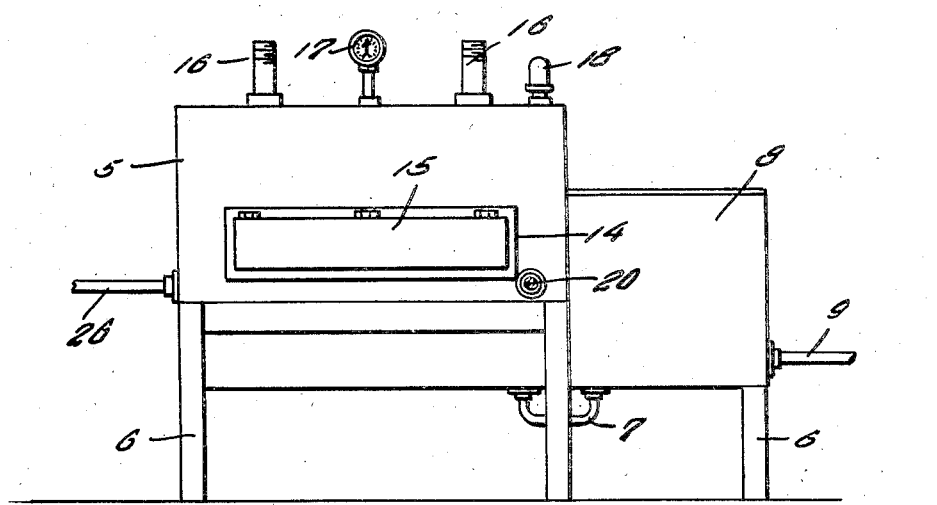

2,017,831

UNITED STATES PATENT OFFICE 2,017,831

ELECTRIC STEAM HEATING PLANT

John Grosseth, Long Beach, N. Y., assignor of one-fourth to Martin Mittelmark, New York, N. Y.

Application February 9, 1934, Serial No. 710,550

1 Claim. (Cl. 219—39)

This invention has reference to steam heating plants and has as its object the provision of improved means for utilizing electricity as a heating medium for the water for generating steam.

In accordance with the present invention the heating medium is located adjacent to the level of the water whereby the generation of steam will result more quickly and in a more efficient manner than where, as is now the common practice, the heating unit or medium is submerged below the level of the water and generally in immediate proximity to the bottom of the steam and water chamber.

The invention together with its objects and advantages will be best understood from a study of the following description taken in connection with the accompanying drawings wherein:

Figure 3 is a vertical transverse sectional view through the plant, and

Figure 4 is a side elevational view of the plant.

Figure 1:
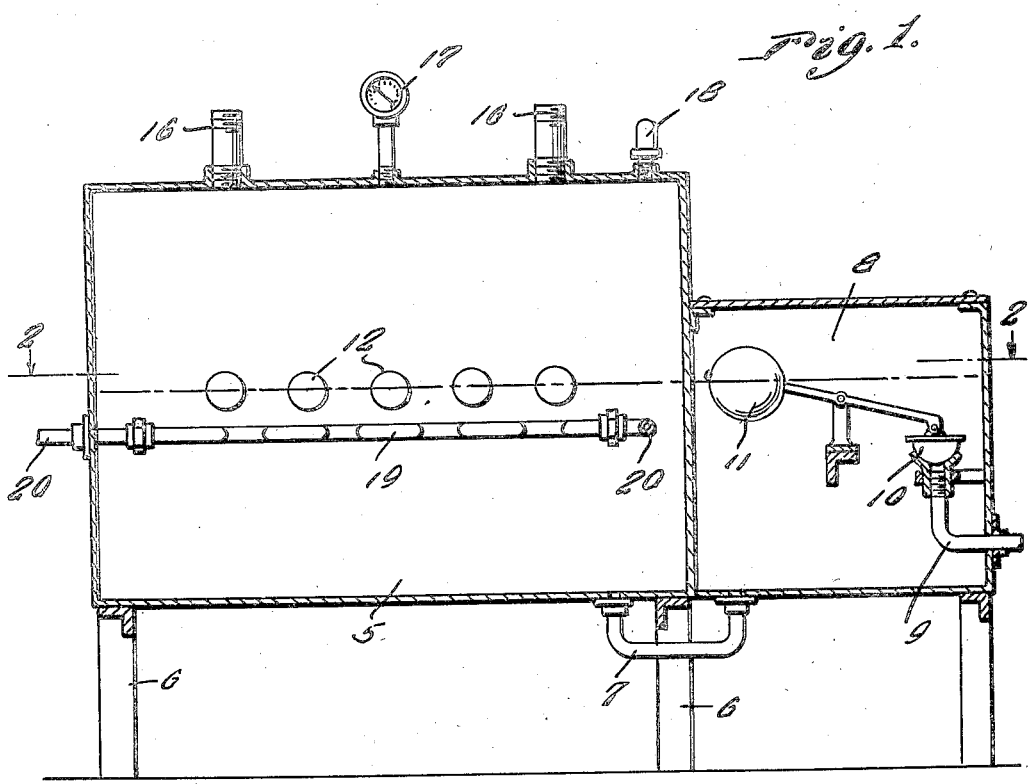
Figure 1 is a vertical sectional view through the plant.
Figure 2:
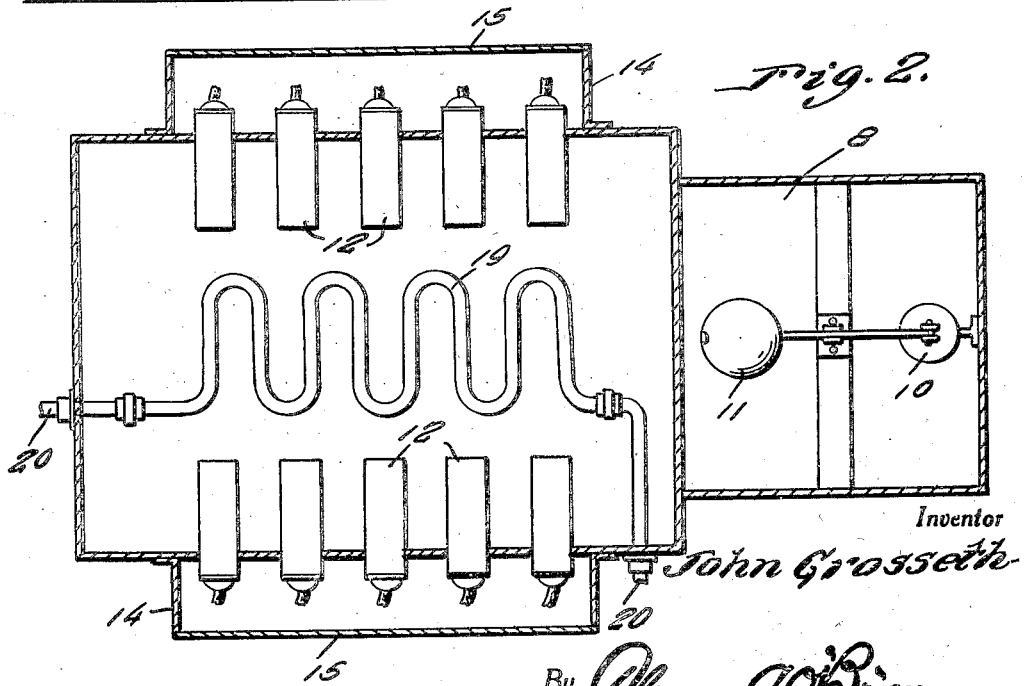
Figure 2 is a horizontal sectional view taken substantially on the line 2—2 of Figure 1.

Referring to the drawings by reference numerals it will be seen that the plant in accordance with the present invention includes a chamber 5, the same being in the form of a drum of any desired cross section and supported on legs or other suitable supporting means 6. The water to be heated is fed to the chamber 5 through a pipe or conduit 7 from a reservoir or control chamber 8. Water from a suitable source of supply is fed to the chamber 8 to piping 9 and is controlled through the medium of a suitable valve 10 operated by a float 11. It will thus be seen that the level of the water in the chamber 5 will be kept constant.

For heating the water in the chamber 5 to generate steam for heating or other suitable purposes there are provided at opposite sides of the chamber 5 a plurality of spaced casings 12 which are suitably mounted and which are preferably of thin brass or any other hard heat resisting metal. The tubes 12 are so located that for substantially the lower half thereof the tubes are disposed below the normal water level as will be clear from a study of Figure 3.

Arranged within the tubes 12 are removable electric heating elements 13 which may be of any suitable construction and design.

The outer ends of the tubes 12 project into casings 14 suitably mounted on the drum and provided with hinged doors or other suitable closures 15 whereby access may be readily had to the heating elements or units 13.

The drum or chamber 5 is also provided with suitable outlets 16 for the steam; a pressure gauge 17, and a safety valve 18.

For heating water for domestic or other purposes there is also provided within the chamber 5 and normally disposed below the level of the water a coil 19 which is connected at its respective ends with the water circulating pipe 20. Water passing through the coil 19 will be heated to a high temperature.

The operation and utility of the device is thought apparent. When the water in the chamber 8 falls below a predetermined level, which is a level corresponding to the level of the water in the chamber 5 the float 11 will move downwardly over the valve 10 and water will then pass from the pipe 9 into the chamber 8 for restoring the normal water level. Water from the chamber 8 is supplied as before mentioned through the piping 7 to the chamber 5 where it is heated to generate steam in sufficient quantity. The steam thus generated is drawn off for heating or other purposes through the outlet 16 and suitable conduits as will be connected therewith.

It will be noted that in accordance with the present invention the heating of the water in the chamber 5 takes place at about the water line or level with the result that the generation of steam will be effected in a more efficient and economical manner.

Having thus described my invention, what I claim as new is:

A steam heating plant having in combination a steam generator including a cylinder shaped water chamber and horizontally disposed spaced electrical heating devices extending in opposite sides thereof at approximately the normal level of the water, said heating devices having a portion thereof extending in the water below the water level and a portion above the water level, and a longitudinally extending coil in said cylinder disposed between said heating unit whereby the heated water may be drawn from said heating plant without interference to the water in said cylinder, said coil consisting of a plurality of substantially U-shaped connected coils all disposed in a common plane.

JOHN GROSSETH.